(12) United States Patent
Haehnle et al.

(10) Patent No.: US 8,272,220 B2
(45) Date of Patent: Sep. 25, 2012

(54) IMPINGEMENT COOLING PLATE FOR A HOT GAS DUCT OF A THERMAL MACHINE

(75) Inventors: Hartmut Haehnle, Kuessaberg (DE); Gregory Vogel, Palm Beach Gardens, FL (US); Russell Bond Jones, Jupiter, FL (US); Marion Duggans (-Oneil), Daytona Beach, FL (US); Remigi Tschuor, Windisch (CH)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 12/860,620

(22) Filed: Aug. 20, 2010

(65) Prior Publication Data

US 2011/0113790 A1    May 19, 2011

Related U.S. Application Data

(63) Continuation of application No. PCT/EP2009/051537, filed on Feb. 11, 2009.

(30) Foreign Application Priority Data

Feb. 20, 2008  (CH) ..................................... 0243/08

(51) Int. Cl.
   *F02C 3/00*  (2006.01)
(52) U.S. Cl. ............... 60/752; 60/737; 60/755; 60/760; 60/804
(58) Field of Classification Search ............... 60/737, 60/752, 753, 760, 804
   See application file for complete search history.

(56) References Cited

U.S. PATENT DOCUMENTS

| 2,555,965 | A | * | 6/1951 | Garber | 60/800 |
| 2,594,808 | A |  | 4/1952 | Rubbra |  |
| 2,699,648 | A | * | 1/1955 | Berkey | 60/756 |
| 2,916,878 | A | * | 12/1959 | Wirt | 60/759 |

(Continued)

FOREIGN PATENT DOCUMENTS

DE    2836539 A1    2/1980

(Continued)

OTHER PUBLICATIONS

International Search Report for PCT/EP2009/051537 mailed on Jun. 2, 2009.

*Primary Examiner* — Ehud Gartenberg
*Assistant Examiner* — Lorne Meade
(74) *Attorney, Agent, or Firm* — Leydig, Voit & Mayer, Ltd.

(57) ABSTRACT

A thermal machine including a wall defining a hot gas duct for transferring a hot gas stream and a cooling jacket disposed at a distance from the wall on an outside of the hot gas duct so as to define a cooling duct with an inlet and an outlet. The cooling duct is configured to conduct a cooling medium along an external face of the wall from the inlet to an outlet in a direction counter to a flow of hot gas in the hot gas duct. An impingement cooling plate is disposed at the inlet of the cooling duct and includes cooling baffle holes configured such that cooling medium entering the cooling duct through the cooling baffle holes flows in a direction perpendicular to the wall. The impingement cooling plate is positioned such that an inflow-side edge sealingly abuts the wall of the hot gas duct so as to reduce a transverse flow of the cooling medium through the cooling duct.

17 Claims, 6 Drawing Sheets

U.S. PATENT DOCUMENTS

| | | | |
|---|---|---|---|
| 2,958,194 A * | 11/1960 | Bayley | 60/760 |
| 3,169,367 A | 2/1965 | Hussey | |
| 4,339,925 A | 7/1982 | Eggmann et al. | |
| 4,362,500 A * | 12/1982 | Eriksson et al. | 431/352 |
| 4,719,748 A * | 1/1988 | Davis et al. | 60/39.37 |
| 4,932,861 A | 6/1990 | Keller et al. | |
| 5,581,994 A | 12/1996 | Reiss et al. | |
| 5,588,826 A | 12/1996 | Doebbeling et al. | |
| 6,134,877 A * | 10/2000 | Alkabie | 60/800 |
| 6,412,268 B1 | 7/2002 | Cromer et al. | |
| 6,966,187 B2 | 11/2005 | Modi et al. | |
| 7,093,440 B2 | 8/2006 | Howell et al. | |
| 7,131,814 B2 | 11/2006 | Nagler et al. | |
| 7,571,611 B2 * | 8/2009 | Johnson et al. | 60/752 |
| 7,707,835 B2 * | 5/2010 | Lipinski et al. | 60/752 |
| 7,921,653 B2 * | 4/2011 | Som et al. | 60/752 |
| 2009/0249791 A1 * | 10/2009 | Belsom | 60/752 |

FOREIGN PATENT DOCUMENTS

| | | |
|---|---|---|
| DE | 4244303 A1 | 6/1994 |
| DE | 4324035 A1 | 1/1995 |
| DE | 19644378 A1 | 4/1998 |
| EP | 0203431 A1 | 12/1986 |
| EP | 0321809 A1 | 6/1989 |
| EP | 0640745 A1 | 3/1995 |
| EP | 0704657 A2 | 4/1996 |
| EP | 1143107 A2 | 10/2001 |
| EP | 1321713 A2 | 6/2003 |
| EP | 1443182 A2 | 8/2004 |
| EP | 1486732 A2 | 12/2004 |
| GB | 2407373 A | 4/2005 |

* cited by examiner

IMPINGEMENT COOLING PLATE FOR A HOT GAS DUCT OF A THERMAL MACHINE

CROSS-REFERENCE TO RELATED APPLICATIONS

This patent application is a continuation of International Patent Application No. PCT/EP2009/051537 filed Feb. 11, 2009, which claims priority to Swiss Patent Application No. 00243/08, filed Feb. 20, 2008, both of which are incorporated by reference herein. The International Patent Application was published as WO 2009/103636 A1 on Aug. 27, 2009.

FIELD

The present invention relates to the field of thermal machines, and further relates to thermal machines including a hot gas duct and a cooling duct disposed outside the hot gas duct.

BACKGROUND

Gas turbines such as are offered by the applicant, for example under, inter alia, the type designation GT13E2, are operated with an annular combustion chamber. The combustion itself may occur using premixer burners (referred to below for short as burners) such as are described, for example, in EP A1 321 809 or AP A1 704 657, wherein these documents and the developments which have been made therefrom are an integrated component of this application, and are incorporated by reference herein. Such an annular combustion chamber is described, for example, in DE A1 196 44 378, which annular combustion chamber is reproduced in certain details in FIG. 1 of this application. The gas turbine 10 which is illustrated in FIG. 1 of this application has a turbine casing 11 which surrounds a plenum 14 which is filled with compressed combustion air in the region of the combustion chamber 15. The annular combustion chamber 15, which merges with a hot gas duct 22, is arranged concentrically around the central rotor 12 in the plenum 14. The space of the combustion chamber 15 is bounded on the inside by an inner shell 21' and on the outside by an outer shell 21. The inner shell 21' and outer shell 21 are each divided in a separating plane into an upper part and a lower part. The upper part and lower part of the inner shell 21' and outer shell 21 are connected in the separating plane in such a way that an annular space is formed which conducts the hot gas generated by the burners 16 to the rotor blades 13 of the turbine. The separating plane is convenient when assembling and disassembling the machine. The combustion chamber 15 itself is lined with special wall segments 17.

The inner shell 21' and outer shell 21 are cooled convectively in the described embodiment. Here, cooling air, which enters the plenum 14 after exiting the compressor as compressed air stream 23, mainly flows in the opposite direction of flow to that of the hot gas in the hot gas duct 22. The cooling air then flows on from the plenum 14 through an outer cooling duct 20 and inner cooling duct 20', which cooling ducts are formed by cooling jackets 19, 19' which surround the shells 21, 21' at a distance. The cooling air then flows along the shells 21, 21' in the cooling ducts 20, 20', in the direction of the combustion chamber dome 18 which surrounds the combustion chamber 15. At said combustion chamber dome 18, the air is then available to the burners 16 as combustion air.

The hot gas flows from the burners to the turbine and in doing so flows along the hot-gas-side surfaces of the inner shell 21' and outer shell 21. The pressure loss which is available for cooling is predefined by the thermodynamic process peripheral conditions. A rise in the pressure drop has an adverse effect on the efficiency of the gas turbine. An efficient manner of cooling in the case of locally high heat transfer coefficients is impingement cooling, in which the cooling medium impinges vertically, in the form of jets, on the surface which is to be cooled. The effect of the impingement cooling (medium heat transfer coefficient) in an existing impingement cooling plate is, however, attenuated by a transverse flow of cooling air in the direction of the cooling duct.

SUMMARY OF THE INVENTION

An aspect of the invention is the construction of a thermal machine in such a way that an improved level of efficiency is obtained through significantly improved cooling.

In an embodiment, the present invention provides a thermal machine including a wall defining a hot gas duct for transferring a hot gas stream and a cooling jacket disposed at a distance from the wall on an outside of the hot gas duct so as to define a cooling duct with an inlet and an outlet. The cooling duct is configured to conduct a cooling medium along an external face of the wall from the inlet to an outlet in a direction counter to a flow of hot gas in the hot gas duct. An impingement cooling plate is disposed at the inlet of the cooling duct and includes cooling baffle holes configured such that cooling medium entering the cooling duct through the cooling baffle holes flows in a direction perpendicular to the wall. The impingement cooling plate is positioned such that an inflow-side edge sealingly abuts the wall of the hot gas duct so as to reduce a transverse flow of the cooling medium through the cooling duct.

BRIEF DESCRIPTION OF THE DRAWINGS

The invention will be described in more detail below with respect to exemplary embodiments and with reference to the drawings. Identical parts are provided with the same reference symbols in the various figures. The direction of flow of the media is indicated with arrows. In the drawings.

DETAILED DESCRIPTION

Figure 1:
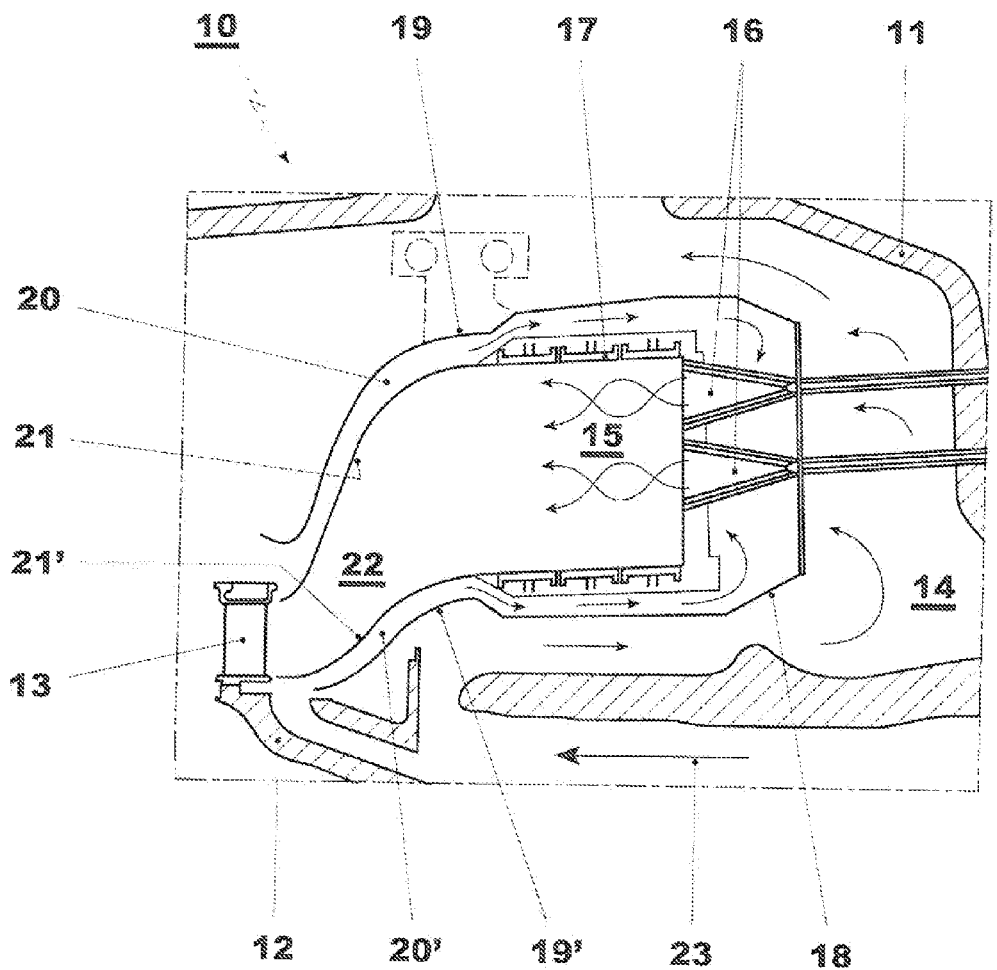
FIG. 1 shows a longitudinal section through a cooled annular combustion chamber of a gas turbine according to the prior art.

The present invention relates to the use of an impingement cooling plate provided at the inlet of the cooling duct, with cooling medium entering the cooling duct through the cooling baffle holes of the impingement cooling plate perpendicularly with respect to the wall of the hot gas duct so as to impinge on the wall of the hot gas duct. In order to reduce a transverse flow of the cooling medium in the cooling duct, the inflow-side edge of the impingement cooling plate abuts the wall of the hot gas duct in a seal-forming fashion.

In one embodiment of the invention the wall has an outwardly protruding shoulder at the inlet of the cooling duct, and the inflow-side edge of the impingement cooling plate abuts the shoulder in a seal-forming fashion. In this embodiment, the inflow-side edge of the impingement cooling plate loosely bears against the shoulder, and the impingement cooling plate is provided, on the inflow-side edge, with a seal which extends along the edge. The seal may be attached to the edge of the impingement cooling plate, and may be connected in a materially joined fashion, such as welded, to the edge of the impingement cooling plate.

According to one development of this embodiment, the seal has a U-shaped cross-sectional profile, and is arranged on the edge in such a way that the open side of the U profile faces away from the shoulder. In particular, the seal may bear against the shoulder with two bearing faces which are perpendicular to one another.

In another embodiment of the invention the impingement cooling plate is held at a predefined distance from the outer shell or inner shell by means of spacer elements.

In yet another embodiment of the invention the impingement cooling plate includes, in succession in the direction counter to the stream of hot gas starting from the inflow-side edge, an end region which runs parallel to the wall, a junction region which is bent outward in an S shape, and a connecting region which runs parallel to the wall, and the inlets, through which the cooling medium can flow into the cooling duct parallel to the wall, are provided in the junction region.

The inlets may each be formed by an inwardly bent tab in the impingement cooling plate, wherein baffles are arranged in the inlets and oriented parallel to the direction of flow.

Furthermore, a plurality of cooling baffle holes can be provided in the end region of the impingement cooling plate, distributed over the surface.

According to another embodiment of the invention, the thermal machine is a gas turbine with a combustion chamber, wherein the hot gas duct leads from the combustion chamber to a first row of rotor blades. In particular, the combustion chamber can be of annular design and can be separated in a separating plane, wherein the hot gas duct is delimited by an outer shell and an inner shell, and an inner and an outer cooling duct are formed by a corresponding inner and outer cooling jacket. Furthermore, the gas turbine can include a compressor for compressing sucked-in combustion air, wherein the outlet of the compressor is connected to a plenum, and the combustion chamber is arranged with the adjoining hot gas duct and the adjoining cooling ducts in the plenum, and is surrounded by the plenum, in such a way that compressed air flows out of the plenum, counter to the flow of hot gas in the hot gas duct, through the cooling ducts to burners which are arranged at the combustion chamber.

The burners may be premixer burners.

According to one embodiment, a flange with an outwardly protruding shoulder may be attached, in particular welded on, to the outer shell or inner shell, wherein the inflow-side edge of the impingement cooling plate abuts the shoulder in a seal-forming fashion.

Figure 2:
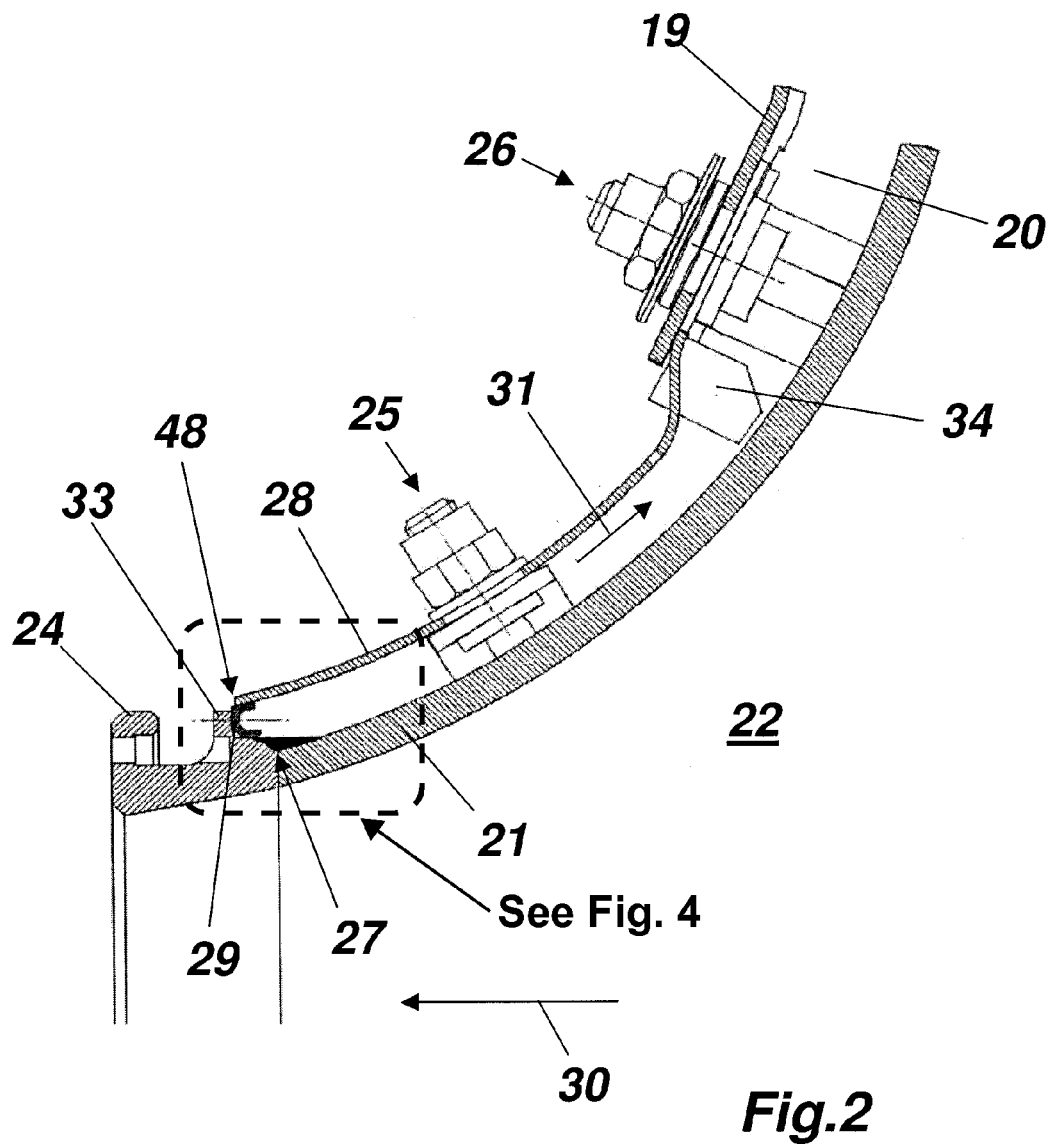
FIG. 2 shows a longitudinal section through the outer cooling duct of a gas turbine in accordance with an embodiment of the invention.

FIG. 2 shows a longitudinal section through the outer cooling duct of a gas turbine which is analogous to FIG. 1 with an inlet-side impingement cooling plate according to an exemplary embodiment of the invention. Only the turbine-side end section of the outer shell 21 which delimits the hot gas duct 22 as a wall and which merges with a welded-on flange 24 (welding seam 27) is illustrated. The outer cooling jacket 19, which is attached to the outer shell 21 at a distance therefrom by means of corresponding spacer elements 26, and delimits an outer cooling duct 20 in the outward direction, already ends significantly before the flange 24.

Figure 3:
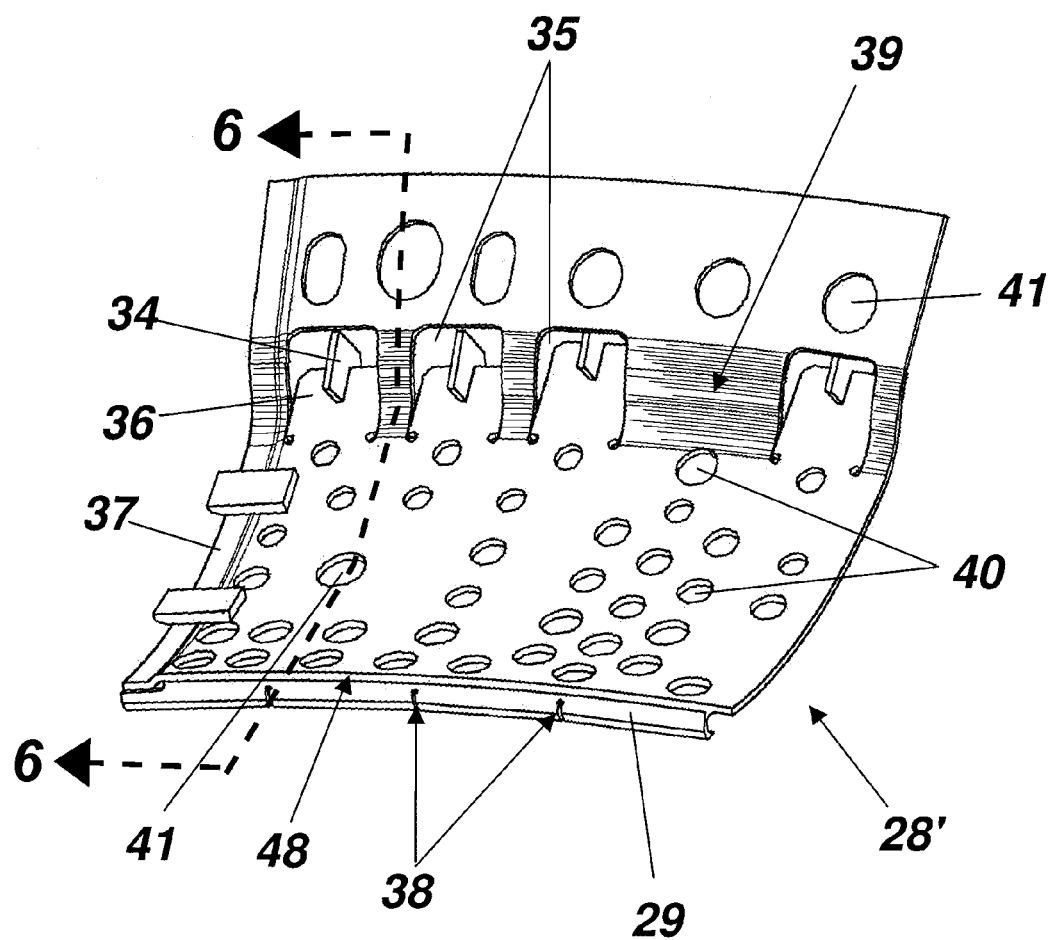
FIG. 3 shows, in a perspective side view, a segment of the impingement cooling plate according of FIG. 2.
Figure 4:
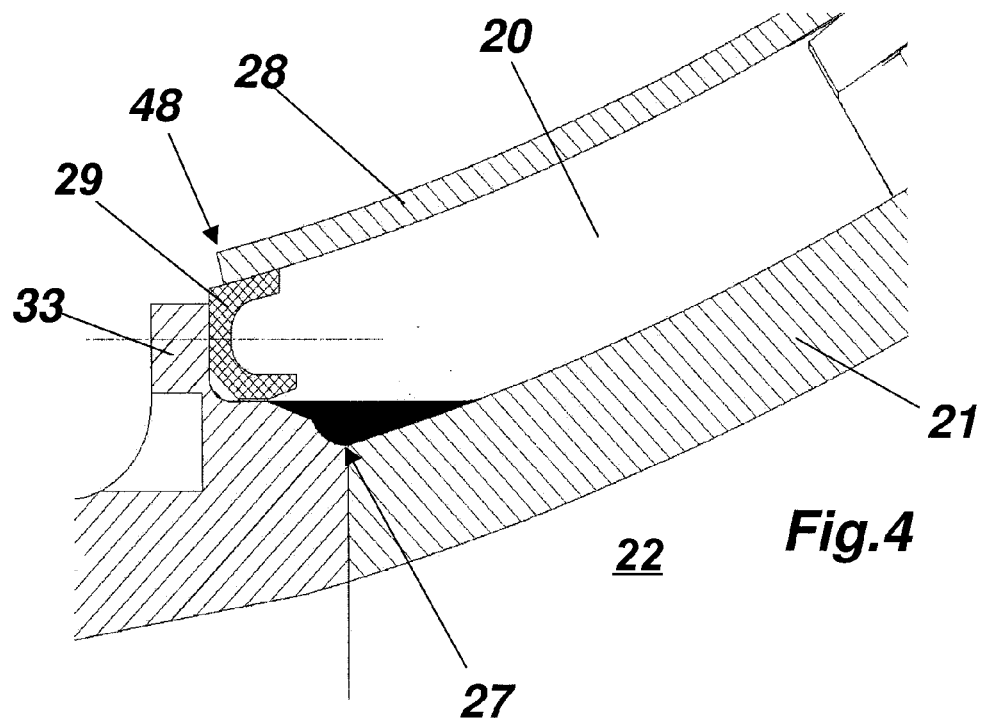
FIG. 4 shows an enlarged detail of the edge-side seal of the impingement cooling plate of FIG. 2.
Figure 6:
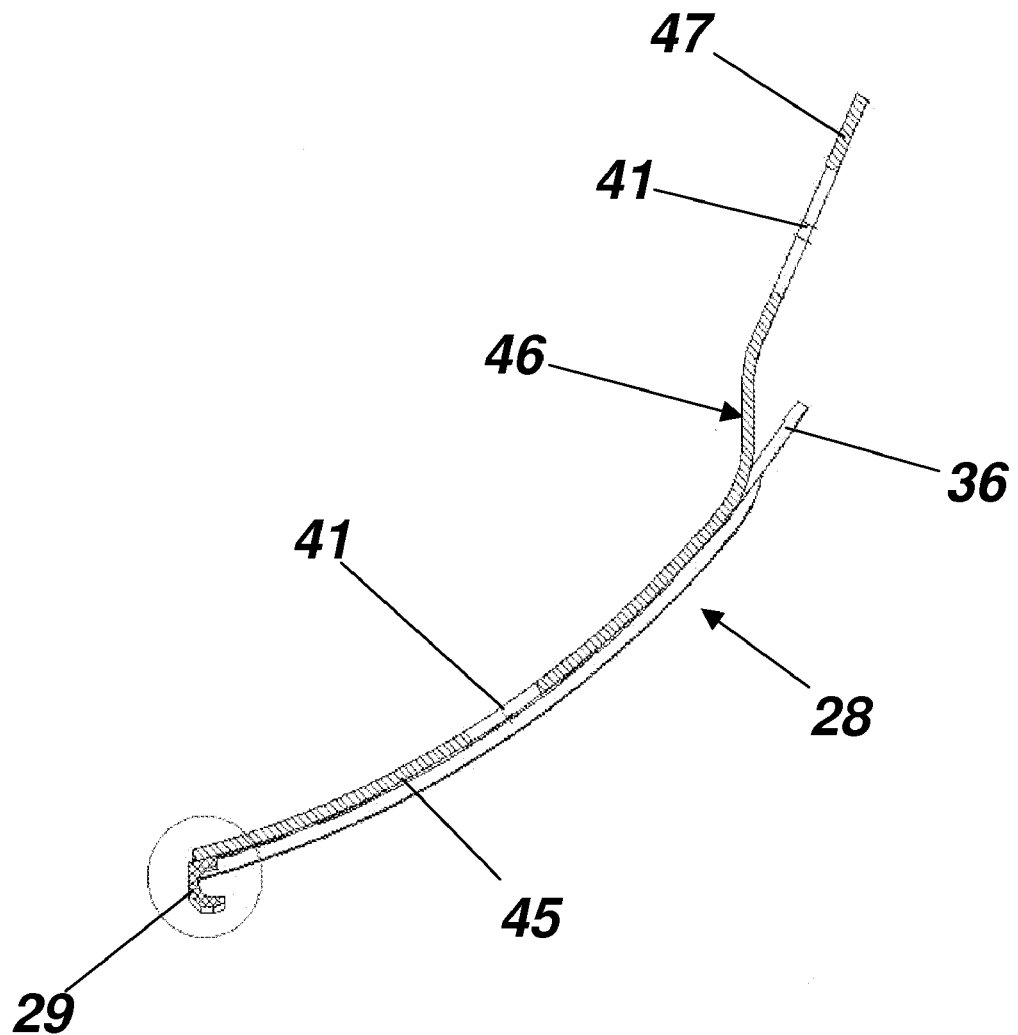
FIG. 6 shows a longitudinal section through the impingement cooling plate from FIG. 2 FIG. 3.
Figure 7:
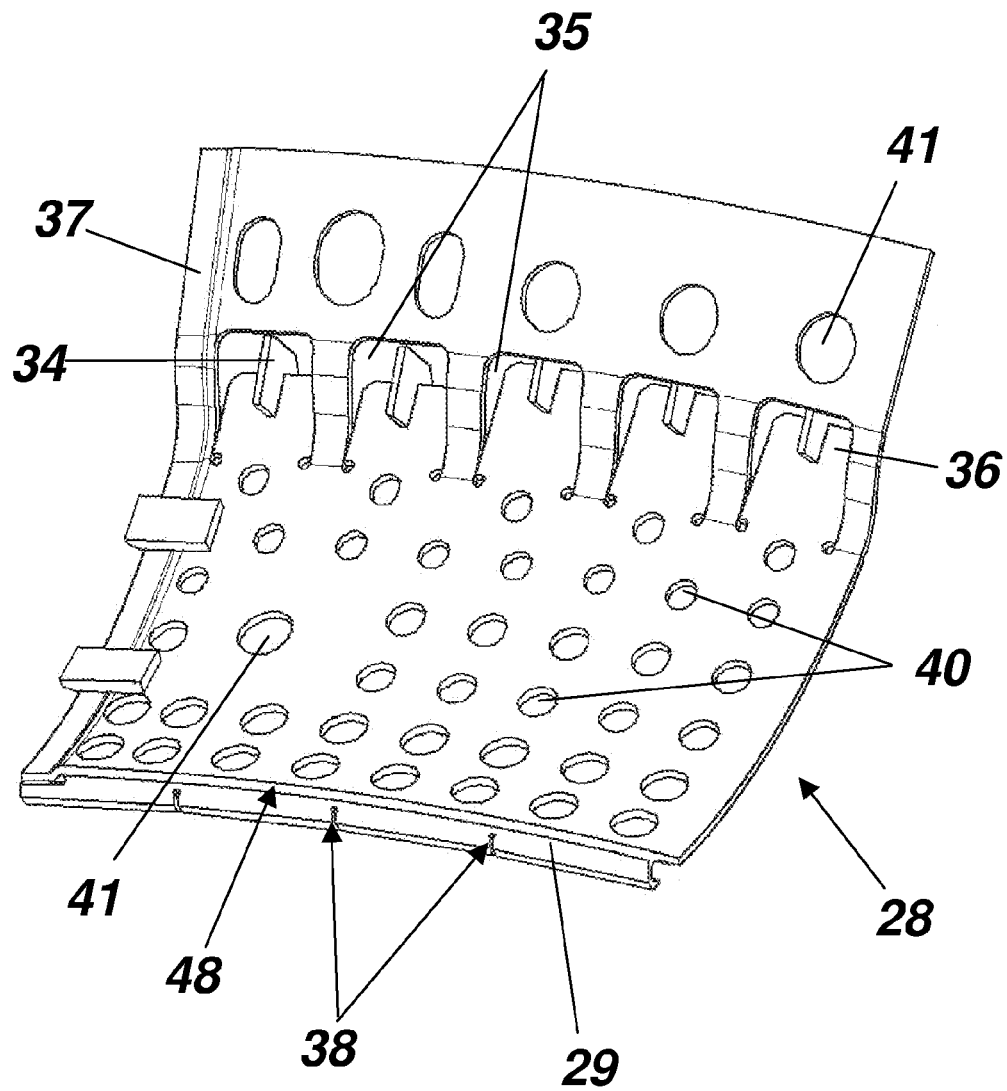
FIG. 7 shows a segment of the impingement cooling plate according to FIG. 2 which segment is used outside the region of the separating plane.

A impingement cooling plate 28 is fitted in between the end of the outer cooling jacket 19 and the flange 24 as a quasi-extension of the cooling jacket 19, said impingement cooling plate 28 being represented in various embodiments and views in FIG. 3, FIG. 6 and FIG. 7, wherein FIGS. 3 and 7 each show just one segment of the plate which has an overall annular shape, while FIG. 6 illustrates the longitudinal section through the plate. The impingement cooling plate 28 and 28', respectively, is divided into three different regions in the direction of flow (FIG. 6), specifically an end region 45 which abuts the flange 24, a junction region 46 which is bent in an S shape and a connecting region 47.

Attachment holes 41, by means of which the impingement cooling plate 28, 28' is attached to the outer shell 21 at a distance using corresponding spacer elements 25 and 26, are provided in the end region 45 and in the connecting region 47, distributed over the circumference of the hot gas duct 22. The spacer elements 26 are used simultaneously for the attachment of the outer cooling jacket 19 and impingement cooling plate 28, 28', as a result of which a continuous junction is implemented between the impingement cooling plate 28, 28' and the outer cooling jacket 19.

Figure 5:
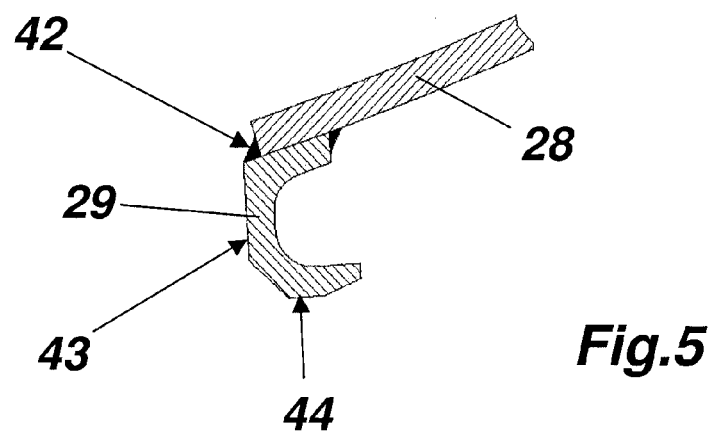
FIG. 5 shows an embodiment of a seal at the edge of the impingement cooling plate.

A seal 29, which bears in a seal-forming fashion against an outwardly protruding and circumferential shoulder 33 which is formed on the flange 24, is arranged at the flange-side end of the impingement cooling plate, i.e. at the transverse edge which delimits the end region 45. The seal 29, which has a U-shaped cross-sectional profile, is, according to FIG. 5, preferably attached in a materially joined fashion, in particular welded on (welded connection 42), to the impingement cooling plate 28 (or 28'), respectively. The strip-shaped seal 29 is oriented with the open side toward the outer cooling duct 20 so that the open side of the U profile faces away from the shoulder 33. The seal 29 abuts, with two bearing faces 43, 44 which are perpendicular to one another, against the shoulder 33 and can move relative to the shoulder so that thermally conditioned displacements can be compensated. The impingement cooling plate segments 28, 28' each have, on one longitudinal side, a connecting strip 37 which produces the connection to the next, adjacent segment.

In the end region 45 of the impingement cooling plate 28, 28', a plurality of cooling baffle holes 40 are provided distributed over the surface, through which cooling baffle holes 40 cooling air enters the intermediate space between the impingement cooling plate 28, 28' and the outer shell 21 from the outside and impinges as a jet perpendicularly on the external face of the outer shell 21. After the impinging on the outer shell 21, and the associated cooling thereof, the cooling air flows into the outer cooling duct 20 as a stream 31 of cooling air counter to the direction of flow of the stream 30 of hot gas, and finally arrives as combustion air in the burner 16. Since the flange-side end (inflow-side edge 48) of the impingement cooling plate 28, 28' abuts against the shoulder 33 of the flange 24 in a seal-forming fashion, virtually no cooling air can enter the intermediate space there between the impingement cooling plate 28, 28' and the outer shell 21 and adversely affect the impingement cooling as a transverse flow. The transverse flow (stream 31 of cooling air) is therefore restricted to the absolute minimum which is determined by the cooling air which enters through the cooling baffle holes 40. However, slits 38 or comparable openings may be provided distributed in the longitudinal direction in the seal 29 (FIGS. 3, 7), through which slits 38 or comparable openings a monitored quantity of cooling air enters along the shoulder 33 and into the intermediate space between the impingement cooling plate 28, 28' and the outer shell 21, and additionally cools the flange 24 in the region of the shoulder 33.

Inlets 35, through which the virtually unrestrictedly large quantities of cooling air can flow into the outer cooling duct 20 in the direction of flow (31) from the plenum 14 in order to convectively cool the outer shell 21, are arranged in the junction region 46 of the impingement cooling plate 28, 28', distributed over the circumference by means of cut-out and inwardly bent tabs 36. In each case a perpendicularly positioned baffle 34, which is oriented in the direction of flow, is arranged in the center of the inlets 35 in such a way that the direction of the flow of cooling air is stabilized. The baffles 34 are not illustrated in FIG. 6.

The distribution of the cooling baffle holes 40 and of the inlets 35 is, as a comparison of FIG. 3 and FIG. 7 shows, different in the segments 28 and 28' in the impingement cooling plate segment 28' in FIG. 3, which covers the separating plane of the combustion chamber, there is no inlet provided in the separating plane region 39. Instead, the thickness and the number of the cooling baffle holes 40 is increased in this region compared to the adjacent regions. In the impingement cooling plate segment 28 of FIG. 7, which is used outside the separating plane, uniform distribution of the cooling baffle holes 40 and inlets 35 is provided.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A thermal machine comprising:
a wall defining a hot gas duct for transferring a hot gas stream;
a cooling jacket disposed at a distance from the wall on an outside of the hot gas duct so as to define a cooling duct with an inlet and an outlet, the cooling duct configured to conduct a cooling medium along an external face of the wall from the inlet to an outlet in a direction counter to a flow of hot gas in the hot gas duct;
an impingement cooling plate disposed at the inlet of the cooling duct and including cooling baffle holes and an inflow-side edge, the impingement cooling plate being configured such that cooling medium entering the cooling duct through the cooling baffle holes flows in a direction perpendicular to the wall, and the impingement cooling plate inflow-side edge sealingly abuts the wall of the hot gas duct by means of a seal so as to reduce a transverse flow of the cooling medium through the cooling duct, wherein the impingement cooling plate includes, in succession in the direction counter to the flow of hot gas, an end region, a junction region and a connecting region, wherein the end region is adjacent the inflow-side edge and runs substantially parallel to the wall, the junction region is bent outward in an S shape and includes a plurality of inlets each configured to direct the cooling medium through the impingement cooling plate in a direction parallel to the wall, and the connecting region runs substantially parallel to the wall, wherein each inlet corresponds to an inwardly bent tab in the impingement cooling plate, wherein a baffle is attached to the inwardly bent tab at an orientation that is parallel to the direction of flow through the inlet.

2. The thermal machine as recited in claim 1, wherein the machine is a gas turbine.

3. The thermal machine as recited in claim 2, further comprising a combustion chamber and rotor, blades, wherein the hot gas duct is disposed between the combustion chamber and a first row of the rotor blades.

4. The thermal machine as recited in claim 3, wherein the combustion chamber is annular and
wherein the wall of the hot gas duct includes an inner shell and an outer shell, and the cooling jacket includes inner and outer cooling jackets forming respective inner and outer cooling ducts.

5. The thermal machine as recited in claim 4, further comprising a compressor configured to compress intake combustion air, and
a plenum connected to an outlet of the compressor,
wherein the combustion chamber is surrounded by the plenum and is arranged with the hot gas duct and cooling ducts such that the compressed air flows out of the plenum counter to the flow of hot gas in the hot gas duct, through the cooling ducts to burners disposed in the combustion chamber.

6. The thermal machine as recited in claim 5, wherein the burners are premixer burners.

7. The thermal machine as recited in claim 4, further comprising a flange attached to one of the outer shell and inner shell, the flange including an outwardly protruding shoulder configured to sealingly abut the inflow-side edge of the impingement cooling plate.

8. The thermal machine as recited in claim 1, wherein the thermal machine is configured to use air as the cooling medium.

9. The thermal machine as recited in claim 1, wherein the wall includes an outwardly protruding shoulder at the inlet of the cooling duct, and wherein the inflow-side edge sealingly abuts the shoulder of the wall by means of the seal.

10. The thermal machine as recited in claim 9, wherein the inflow-side edge of the impingement cooling plate loosely bears against the shoulder.

11. The thermal machine as recited in claim 9, wherein the seal extends along the inflow-side edge.

12. The thermal machine as recited in claim 11, wherein the seal is attached to the inflow-side edge.

13. The thermal machine as recited in claim 12, wherein the seal is attached in a materially joined manner.

14. The thermal machine as recited in claim 13, wherein the seal has a U-shaped cross-sectional profile having an open side facing away from the shoulder.

15. The thermal machine as recited in claim 14, wherein the seal includes two bearing faces disposed perpendicularly to each other, the two faces bearing against the shoulder.

16. The thermal machine as recited in claim 1, further comprising spacer elements holding the impingement cooling plate at a predefined distance from the wall.

17. The thermal machine as recited in claim 1, wherein at least a portion of the cooling baffle holes are distributed over a surface of the end region.

\* \* \* \* \*